(12) United States Patent
Nagaraj et al.

(10) Patent No.: US 8,316,334 B2
(45) Date of Patent: Nov. 20, 2012

(54) SEGMENT AND BIPARTITE GRAPH BASED APPARATUS AND METHOD TO ADDRESS HOLD VIOLATIONS IN STATIC TIMING

(75) Inventors: Kelageri Nagaraj, San Diego, CA (US); Satish K. Raj, San Diego, CA (US); Venugopal Sanaka, San Diego, CA (US); Raghavendra C. Dasegowda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 12/699,964

(22) Filed: Feb. 4, 2010

(65) Prior Publication Data

US 2011/0191733 A1 Aug. 4, 2011

(51) Int. Cl.
*G06F 17/50* (2006.01)
(52) U.S. Cl. ......... 716/114; 716/113; 716/132; 716/134
(58) Field of Classification Search .......... 716/113–114, 716/132, 134
See application file for complete search history.

(56) References Cited

U.S. PATENT DOCUMENTS

| | | | | | |
|---|---|---|---|---|---|
| 5,475,607 | A * | 12/1995 | Apte et al. | ...................... | 716/113 |
| 5,796,621 | A * | 8/1998 | Dudley et al. | .................. | 716/103 |
| 5,841,673 | A * | 11/1998 | Kobayashi et al. | ............ | 716/108 |
| 6,412,096 | B1 * | 6/2002 | Ventrone | ........................ | 716/108 |
| 6,477,688 | B1 * | 11/2002 | Wallace | ......................... | 716/107 |
| 6,671,866 | B2 * | 12/2003 | Arsintescu | ..................... | 716/124 |
| 6,836,753 | B1 * | 12/2004 | Silve | .................................. | 703/2 |
| 6,948,138 | B1 * | 9/2005 | Shen | .............................. | 716/114 |
| 7,047,163 | B1 * | 5/2006 | Chakraborty et al. | ............. | 703/2 |
| 7,487,486 | B2 * | 2/2009 | Celik et al. | ...................... | 716/134 |
| 7,624,364 | B2 * | 11/2009 | Albrecht et al. | .............. | 716/113 |
| 7,801,901 | B2 * | 9/2010 | Surendran | ...................... | 707/748 |
| 7,882,461 | B2 * | 2/2011 | Jiang et al. | ....................... | 716/132 |
| 2003/0101399 | A1 | 5/2003 | Yoshikawa | | |
| 2005/0268263 | A1 | 12/2005 | Sun et al. | | |
| 2009/0158116 | A1 * | 6/2009 | Kim | .............................. | 714/752 |
| 2009/0254874 | A1 * | 10/2009 | Bose | ................................. | 716/6 |
| 2009/0293029 | A1 | 11/2009 | Zuo et al. | | |
| 2011/0252389 | A1 * | 10/2011 | Albrecht et al. | .............. | 716/108 |

OTHER PUBLICATIONS

Lucas; "Timing analysis and behavioral synthesis with process variation"; Pennsylvania State University, 2009; pp. 1-70.*
International Search Report and Written Opinion—PCT/US2011/023722—ISA/EPO—May 2, 2011.

* cited by examiner

*Primary Examiner* — Naum Levin
(74) *Attorney, Agent, or Firm* — Sam Talpalatsky; Nicholas J. Pauley; Jonathan T. Velasco (57) ABSTRACT

A method of reducing the number of hold violations in an integrated circuit comprises: determining a segment, wherein the segment is a connection between a plurality of points; associating at least one path with each segment, wherein the path is a connection of points including a starting point and an endpoint; determining a weight for at least one said segment, wherein the weight is determined by a number of paths associated with the at least one said segment; ranking the segments in a matrix based upon the determined weight associated with at least one of the segments; and inserting a buffer at least one of the segments based upon said ranking.

40 Claims, 6 Drawing Sheets

SEGMENT AND BIPARTITE GRAPH BASED APPARATUS AND METHOD TO ADDRESS HOLD VIOLATIONS IN STATIC TIMING

FIELD OF DISCLOSURE

Disclosed embodiments are related to a systematic solution to repair design errors, and more particularly to a segment and bipartite graph based solution to address hold violations in static timing.

BACKGROUND

Semiconductor integrated circuits (ICs) are typically designed and fabricated by preparing a schematic diagram or hardware description language (HDL) specification of a logical circuit in which functional elements are interconnected to perform a particular logical function. The schematic diagram or HDL specification is synthesized into cells of a particular cell library. Each cell corresponds to a logical function unit, which is implemented by one or more transistors or other devices. A series of computer-aided design tools generate a netlist of the selected cells and the interconnections between the cells. The netlist is used by a floor-planner or placement tool to place the selected cells at particular locations in an integrated circuit layout pattern. The interconnections between the cells are then routed along predetermined routing layers. Once the selected cells have been placed and routed, the netlist, the cell layout definitions, the placement data and the routing data together form an integrated circuit layout definition, which is used to fabricate the integrated circuit.

During various stages of the design process, verification tools are used to verify different aspects of the design, such as the logic or analog function, the timing, and adherence to certain design rules. One measure of the performance of an IC is expressed by the time delays within the circuit, such as propagation delays, setup delays and hold delays. Propagation delays include the time required for a signal to travel from one location to another, such as from the input of a cell to the output of the cell. A setup delay is the time duration that a signal must be available at an input to a cell prior to a respective clock or other signal transition. A hold delay is the time duration that a signal must be stable after a respective clock or other signal transitions.

Further, a worst case setup violation refers to a violation that occurs at a cell input assuming that the signal path leading to that input has a worst case (maximum) delay over variations in process, voltage and temperature. A best case hold violation refers to a violation that occurs at a cell input assuming that the signal path leading to that input has a best case (minimum) delay over variations in process, voltage and temperature. Therefore, one variation of a hold violation may be perceived as when the signal arrives too early at the destination, resulting in errors or violations in the system.

Since setup violations traditionally have been more difficult to solve than hold violations, the adjustment and repair of best case hold violations within the design process are often ignored until after much of the functional verification and setup violations have been fixed. Therefore, designers often look for a minimal-effort approach.

However, fixing the hold violations in a design is a crucial phase in static timing analysis. The delays can be in the form of buffers or delay cells. In a design which has already gone through Physical Design (PD), the number of additional buffers and delay cells which are added to fix hold violations will have to be restricted to a minimum in order to reduce the PD and static timing iteration. Additional buffers/delay cells increase the power, area and effect of process variation. But at the same time, the hold violations will have to be fixed.

The conventional approach to resolving hold violations is to determine if enough setup margin exists to delay the data via inserting a buffer or cell at the input pin of the violating storage element, such as a flip-flop or a memory device. For example, if an endpoint with a hold violation has enough setup margin, the designer may insert a generic buffer at the endpoint (i.e. input pin to the flip-flop), thereby delaying the incoming signal relative to the clock input. However, if the setup margin does not allow for the addition of buffers/delay cells at the endpoint, then the timing path is traced back to find an appropriate insertion point. Further, if the hold violations cannot be fixed in a single timing path, then other timing paths are explored to correct the hold violations in the same manner noted above. Therefore, the conventional approach unnecessarily adds additional buffers and does not utilize a bottleneck-based analysis. Further, the conventional approach has a designer sorting through hundreds or even thousands of possible paths, in order to repair hold violations.

As a result, a need exists to minimize the number of buffer or delay cells used to fix hold violations. By reducing the number of hold buffers utilized in the design, the amount of power utilized by the design is less, the size of the design can be further reduced and the probability of process variations is reduced. It also helps in the placement and routing of highly congested designs. Furthermore, a need also exists for a method and/or apparatus that not only addresses the hold violations, but also does not degrade setup violations by verifying that enough setup margin is available.

SUMMARY

Exemplary embodiments are directed to systems and methods for reducing the number of hold violations in an integrated circuit.

In one embodiment, a method of reducing the number of hold violations in an integrated circuit comprises: determining a segment, wherein the segment is a connection between a plurality of points; associating at least one path with each segment, wherein the path is a connection of points including a starting point and an endpoint; determining a weight for at least one said segment, wherein the weight is determined by a number of paths associated with the at least one said segment; ranking the segments in a matrix based upon the determined weight associated with at least one of the segments; and inserting a buffer at least one of the segments based upon said ranking.

In another embodiment, an apparatus for reducing the number of hold violations in an integrated circuit comprises a processor and a memory. The processor is configured to: determine a segment, wherein the segment is a connection between a plurality of points; associate at least one path with each segment, wherein the path is a connection of points including a starting point and an endpoint; determine a weight for at least one said segment, wherein the weight is determined by a number of paths associated with the at least one said segment; rank the segments in a matrix based upon the determined weight associated with at least one of the segments; and insert a buffer at at least one of the segments based upon said ranking. The memory is coupled to the processor and used for storing data.

In another embodiment, an apparatus for reducing the number of hold violations in an integrated circuit comprises: means for determining a segment, wherein the segment is a connection between a plurality of points; means for associating at least one path with each segment, wherein the path is a connection of points including a starting point and an endpoint; means for determining a weight for at least one said segment, wherein the weight is determined by a number of paths associated with the at least one said segment; means for ranking the segments in a matrix based upon the determined weight associated with at least one of the segments; and means for inserting a buffer at at least one of the segments based upon said ranking.

In another embodiment, a computer-readable storage medium comprises code, which, when executed by a processor, causes the processor to perform operation for reducing the number of hold violations in an integrated circuit. The computer-readable storage medium comprises: code for determining a segment, wherein the segment is a connection between a plurality of points; code for associating at least one path with each segment, wherein the path is a connection of points including a starting point and an endpoint; code for determining a weight for at least one said segment, wherein the weight is determined by a number of paths associated with the at least one said segment; code for ranking the segments in a matrix based upon the determined weight associated with at least one of the segments; and code for inserting a buffer at least one of the segments based upon said ranking.

In another embodiment, a method of reducing the number of hold violations in an integrated circuit comprises: step for determining a segment, wherein the segment is a connection between a plurality of points; step for associating at least one path with each segment, wherein the path is a connection of points including a starting point and an endpoint; step for determining a weight for at least one said segment, wherein the weight is determined by a number of paths associated with the at least one said segment; step for ranking the segments in a matrix based upon the determined weight associated with at least one of the segments; and step for inserting a buffer at least one of the segments based upon said ranking.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Aspects of the embodiments are disclosed in the following description and related drawings directed to such embodiments. Alternate embodiments may be devised without departing from the scope of the invention. Additionally, well-known elements used and applied in the embodiments will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figures 1A, 1B, 1C:
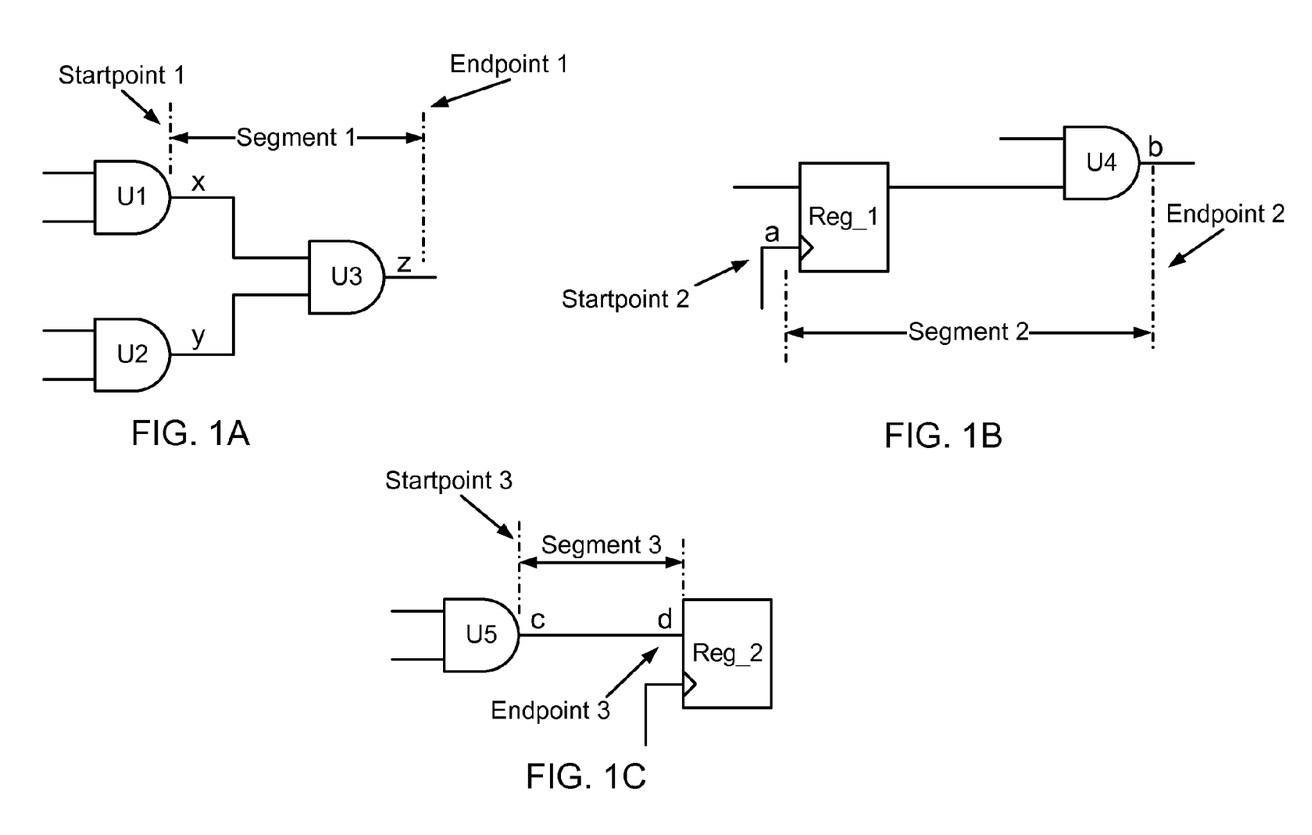
FIG. 1A illustrates a series of logic gates, each of which are commonly utilized in digital systems.
FIG. 1B illustrates a series of logic gates, sequential and combinational, each of which are commonly utilized in digital systems.
FIG. 1C illustrates a series of logic gates, sequential and combinational, each of which are commonly utilized in digital systems.

Referring to FIGS. 1A, 1B, and 1C, a series of logic gates is illustrated, each of which are commonly utilized in digital systems. The implementation of the logic gates will not be described herein, as these devices are commonly utilized. As shown in FIG. 1, a segment may be defined as anything between two cells or logic devices where no branching occurs between the two cells or logic devices. Furthermore, each of the segments has a starting point and an endpoint.

For example, in FIG. 1A, segment 1 can extend from the output of one cell (logic gate U1 and/or U2) to the output of the driven cell (logic gate U3). Further, segment 1 has both a starting point (startpoint 1) and an endpoint (endpoint 1). These startpoints and endpoints are the start and end of a segment respectively, and may not be the startpoint and endpoint of a timing path.

For example, in FIG. 1B, segment 2 can extend from the clock input of one cell (Reg_1) to the output of the driven cell (logic gate U4). Further, segment 2 has both a starting point (startpoint 2) and an endpoint (endpoint 2).

For example, in FIG. 1C, segment 3 can extend from the output of one cell (U5) to the input of an endpoint register (Reg_2). Further, segment 3 has both a starting point (startpoint 3) and an endpoint (endpoint 3).

Further, it is noted that even if another cell or logic device (intermediate device) was positioned between the startpoint and endpoint, if there is only 1 input and 1 output for the intermediate device, then still only one segment is present.

Any digital logic design or layout may be modeled in a manner similar to that shown in FIG. 1A-1C. Further, a startpoint can have multiple timing paths leading from it and an endpoint can have multiple timing paths leading to it. Therefore, even though startpoints and endpoints are common, each of the timing paths connecting the startpoints and endpoints are different. Thus, each timing path that leads to a particular endpoint is unique and is characterized as an "endpoint path."

Figure 2:
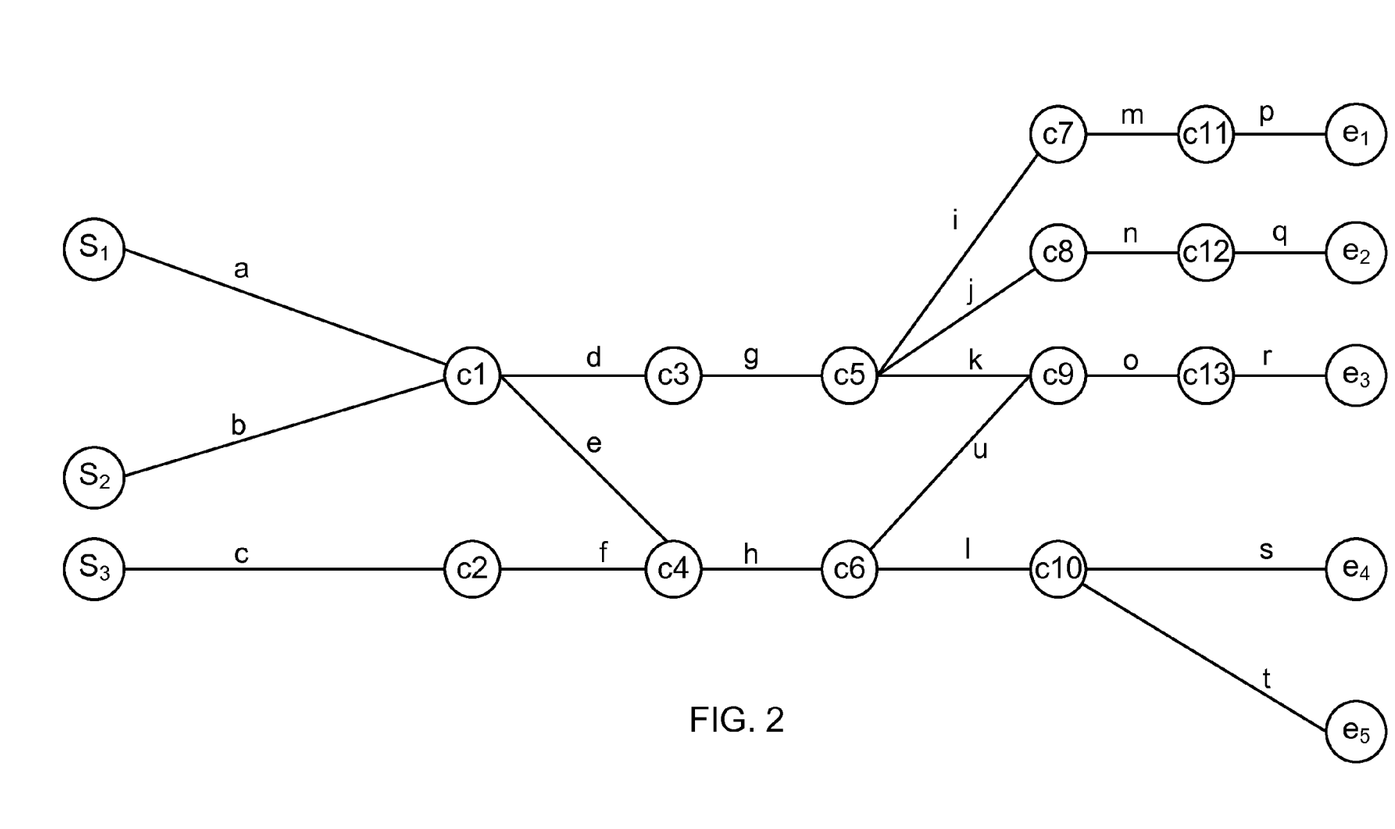
FIG. 2 illustrates a graphical representation of timing paths for each of the segments.

FIG. 2 illustrates a graphical representation of timing paths for each of the segments. As shown in FIG. 2, nodes $s_1$, $s_2$ and $s_3$ represent startpoints of each timing path and nodes $e_1$, $e_2$, $e_3$, $e_4$ and $e_5$ represent endpoints of each timing path. Further, nodes c1, c2, c3, c4, c5, c6, c7, c8, c9, c10, c11, c12 and c13 represent intermediate cells positioned between the startpoints and endpoints and each of the segments are marked with lower case alphabet letters. For example, segment "a" is located between startpoint $s_1$ and intermediate node c1 and segment "h" is located between intermediate node c4 and intermediate node c6. Furthermore, each endpoint may be controlled by a master clock, and therefore, signals must arrive at the endpoints in synch with the master clock.

Table 1 illustrates each of the timing paths shown in FIG. 2 and their associated path numbers. For example, segment "p" has 2 different timing paths; timing paths "$S_1$-a-d-g-i-m-p-$e_1$" and "$s_2$-b-d-g-i-m-p-$e_1$." Thus, each of the timing paths illustrated in FIG. 2 is listed in Table 1.

TABLE 1

Timing paths

| Path no. | Paths |
|---|---|
| 1 | $s_1$-a-e-h-u-o-r-$e_3$ |
| 2 | $s_1$-a-e-h-l-s-$e_4$ |
| 3 | $s_1$-a-e-h-l-t-$e_5$ |
| 4 | $s_1$-a-d-g-i-m-p-$e_1$ |
| 5 | $s_1$-a-d-g-j-n-q-$e_2$ |
| 6 | $s_1$-a-d-g-k-o-r-$e_3$ |
| 7 | $s_2$-b-e-h-u-o-r-$e_3$ |
| 8 | $s_2$-b-e-h-l-s-$e_4$ |
| 9 | $s_2$-b-e-h-l-t-$e_5$ |
| 10 | $s_2$-b-d-g-i-m-p-$e_1$ |
| 11 | $s_2$-b-d-g-j-n-q-$e_2$ |
| 12 | $s_2$-b-d-g-k-o-r-$e_3$ |
| 13 | $s_3$-c-f-h-u-o-r-$e_3$ |
| 14 | $s_3$-c-f-h-l-s-$e_4$ |
| 15 | $s_3$-c-f-h-l-t-$e_5$ |

Further, each of the timing paths and segments illustrated in FIG. 2 have hold violations. Therefore, in order to correct each of the hold violations using the exemplary process herein, each segment of the timing paths shown in FIG. 2 is assigned a weight (shown in Table 2). The weight may be equal to the number of timing paths which pass through the segment leading to the endpoint or the number of endpoint paths driven by each segment.

Figure 3:
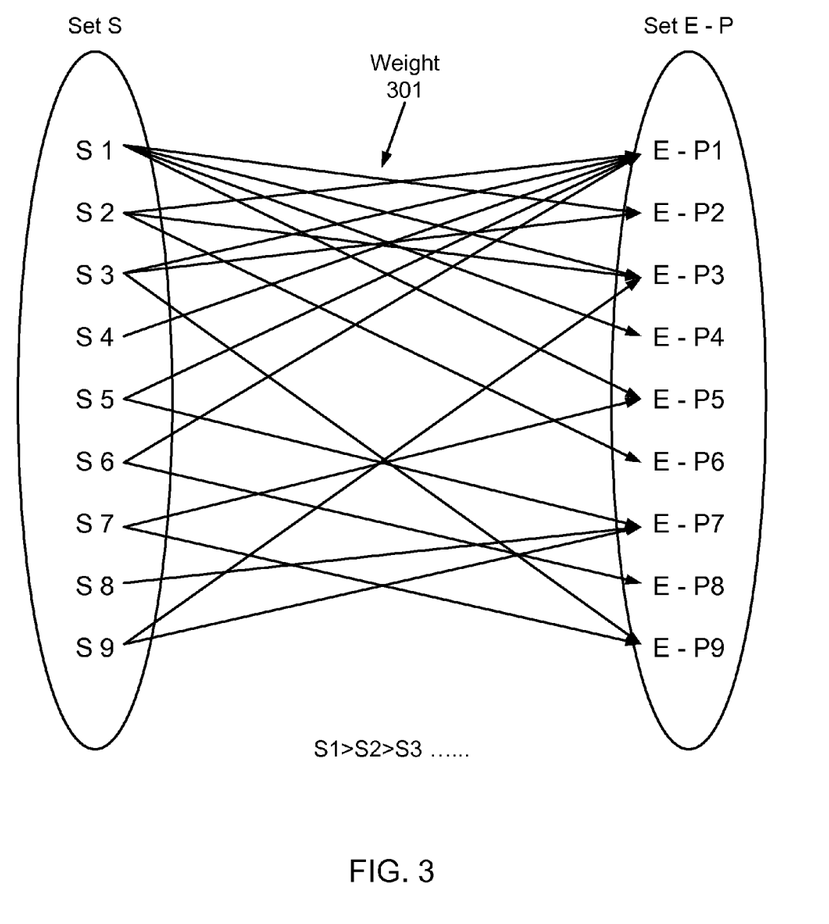
FIG. 3 illustrates a bipartite graph that can be utilized in the design of circuits.

Further, as noted above, an endpoint path is when each endpoint can appear in multiple timing paths which have hold violations and the weights assigned to each of the segments can equate to the number of endpoint-paths driven by the segment. As shown in FIG. 3, the bipartite graph consists of mapping a set of segments (Set S) to another set consisting of endpoints (Set E-P). In the bipartite graph, the set E-P consists of all the endpoint-path in the set of given timing paths.

Table 2 illustrates segments and weights for each of the various timing paths illustrated in FIG. 2.

TABLE 2

Segments and Weights

| Segment(s) | Weight(s) |
|---|---|
| h | 9 |
| g | 6 |
| d | 6 |
| e | 6 |
| a | 6 |
| b | 6 |
| l | 6 |
| r | 5 |
| o | 5 |
| u | 3 |
| s | 3 |
| t | 3 |
| f | 3 |
| c | 2 |
| m | 2 |
| i | 2 |
| q | 2 |
| j | 2 |
| k | 2 |
| p | 2 |

For example, Table 2 illustrates that segment "p" has a weight of "2" because it appears in 2 timing paths; timing paths "$s_1$-a-d-g-i-m-p-$e_1$" and "$s_2$-b-d-g-i-m-p-$e_1$." As described above, the weight(s) are equal to the number of timing paths which pass through a particular segment leading to an endpoint (which has hold violations) or the number of endpoint paths driven by each segment with hold violations. Similarly the weights for each of the other segments illustrated in FIG. 2 are also shown above in Table 2.

Furthermore, Table 2 also is organized in the descending order of the weights assigned to each segment. Thus, each of the segments and their corresponding weight(s) are organized in descending order, from the segment with the largest weight to the segment with the lowest weight. For example, Table 2 illustrates that segment "h" has the largest weight with a value equal to "9." Thus, when the exemplary process herein (as described in FIG. 4) is utilized in order to correct each of the hold violations, segment 'h' is the first segment selected for inserting the buffers.

FIG. 3 illustrates a bipartite graph that can be utilized in the design of circuits. A bipartite graph (or bi-graph) is a graph whose vertices can be divided into two disjoint sets (S and E-P), such that every edge connects a vertex in S to one in E-V; in other words, S and E-P are independent sets.

As shown in FIG. 3, the bipartite graph consists of mapping a set of segments (Set S) to another set consisting of endpoints (Set E-P). Thus, each of the segments form the elements of the set S in the bipartite graph. Further, each segment can have a weight 301 associated with it. The weight 301 of the mapping may be equal to the number of endpoint paths driven by each segment. For example, as shown in FIG. 3, the set S consists of segments ($s_1$, $s_2$, $s_3$ . . . ) and the corresponding weights (301a, 301b, 301c . . . ) are sorted in descending order based on the weight values assigned to each segment.

Afterwards, the first segment $S_1$ in the set (which has the largest weight) is utilized to insert a buffer at segment $S_1$ and all of the endpoint-paths driven by the first segment are removed from the E-P set.

Afterwards, the segments in the set S are assigned new weights because some of the timing paths which previously had hold violations were fixed by the insertion of the buffer at segment $S_1$ and therefore the weight values have changed. Furthermore, segment $S_1$ is removed from the set S.

The processes of sorting the segment set based on the weights, inserting the buffer at the segment on the top of list, removing the endpoint-path elements from the E-P set and reassigning the weights to the segments is iterated until all the endpoints-path are fixed. The details of this process are illustrated in FIG. 4.

Figure 4:
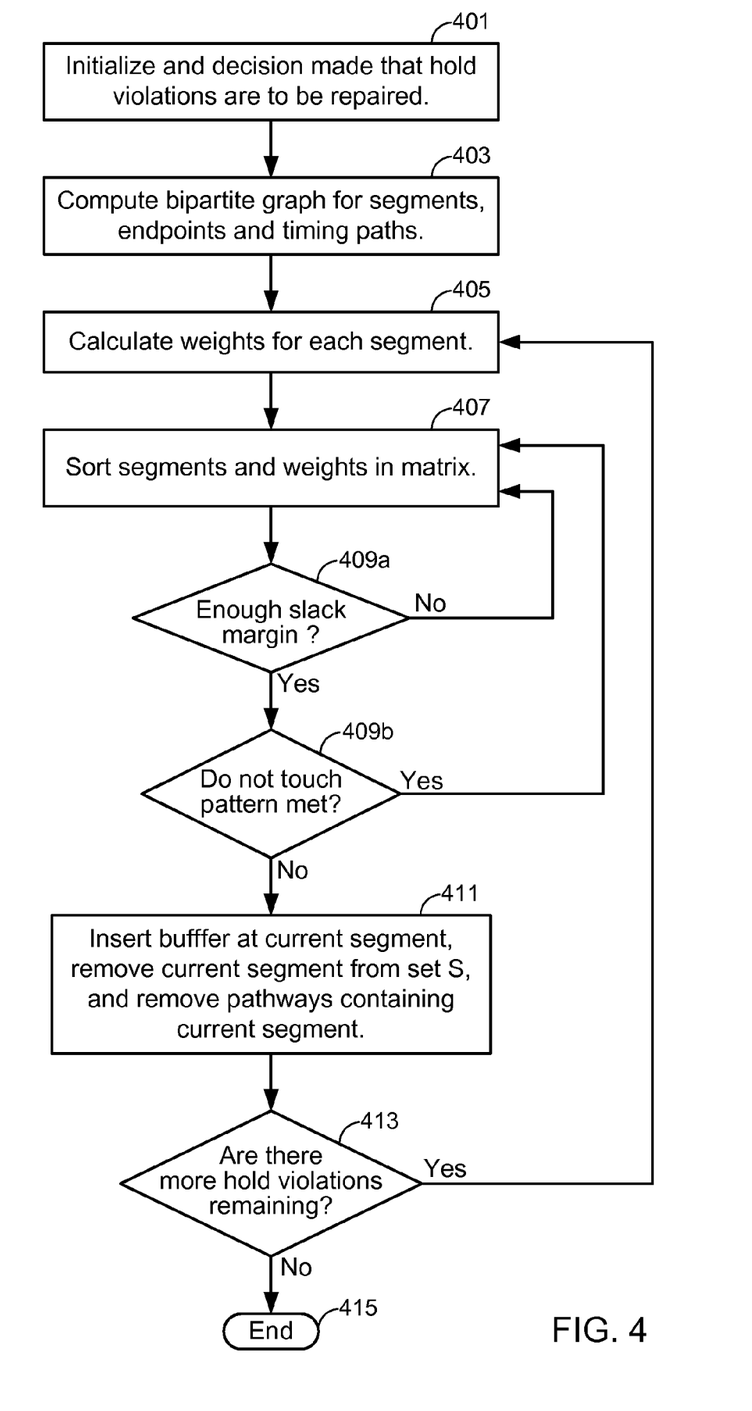
FIG. 4 illustrates a diagram of an exemplary method for a segment and bipartite graph based bottleneck analysis for fixing hold violations.

FIG. 4 illustrates a diagram of an exemplary method for a segment and bipartite graph based bottleneck analysis for fixing hold violations.

At step 401, the exemplary method is initialized such that a decision is made to repair a number of hold violations.

At step 403, a bipartite graph is computed for a number of data values. For example, the bipartite graph may consist of mapping a set of segments (Set S in FIG. 3) to another set consisting of endpoints (Set E-P in FIG. 3) via timing paths or endpoint paths. Thus, each of the segments can form the elements of the set S in the bipartite graph. Further, the bipartite graph may also be in the form illustrated in FIG. 3, such that the bipartite graph may also have a set of timing paths as that shown in FIG. 2.

At step 405, the weights for each segment are calculated. The weight of the mapping may be equal to the number of endpoint paths or timing paths driven by each segment or the number of timing paths which pass through the segment leading to the endpoint. For example, as shown in FIG. 3, the set S consists of segments ($s_1$, $s_2$, $s_3$ . . . ) and the corresponding weights (301a, 301b, 301c . . . ).

At step 407, the segments and corresponding weights are sorted in descending order in a matrix based on each weight value. For example, the matrix may take the form as that shown in Table 2 for each of the various timing paths illustrated in FIG. 2. Thus, each of the segments and their corresponding weight(s) are organized in descending order from the segment with the largest weight to the segment with the lowest weight. The segment with the largest weight is defined as the current segment. However, it is understood that this is an exemplary illustration, and that other matrices exist.

At step 409, two parameters, the setup slack margin and do not touch pattern, are taken into consideration. Setup slack margin determines the setup slack available at a node or an endpoint and helps determine whether the delay introduced by the addition of a HOLD buffer will create a SETUP violation. For example, if the setup slack is positive 100 picoseconds and the delay introduced by the HOLD buffer is 120 picoseconds, then the insertion of a HOLD buffer will create a SETUP violation. The do not touch pattern determines the segments in a endpoint path or a timing path at which the insertion of a buffer is not advised. For example, a do not touch pattern can be a memory input pin where there is a high chance of routing congestion and adding a buffer there will create more routing congestion. If there is not enough setup slack margin at the current segment (step 409a) or if the current segment is a do not touch pattern (step 409b), then the buffer cannot be inserted for the current segment and the exemplary method proceeds to step 407 where the next segment in the matrix is chosen and the exemplary method continues. However, if there is enough setup slack margin at the current segment (step 409a) or if the current segment is not a do not touch pattern (step 409b), then the buffer can be inserted for the current segment and the exemplary method proceeds to step 411.

At step 411, a buffer is inserted at the current segment with the largest weight (the first segment in the set S). Thus, all of the endpoint-paths driven by the current segment are removed from the E-P set and the current segment (i.e. $s_1$) is removed from the set S.

At step 413, the exemplary method determines if more hold violations remain. If there are no more hold violations remaining, then the exemplary method proceeds to step 415. If there are more hold violations remaining, then the exemplary method proceeds to step 405. (It is noted on the subsequent iteration of step 405, each of the remaining segments in the set S are assigned new weights because some of the timing paths which previously had hold violations were fixed by the insertion of the buffer at segment $S_1$. Afterwards, on the subsequent iteration the exemplary method returns to step 407 to re-rank or re-compute the matrix.)

At step 415, the exemplary method has determined that there are no more hold violations, thus the exemplary method ends.

As a result, at each iteration, some amount of hold violations can be fixed. Eventually, all of the hold violations are fixed, provided each endpoint path has enough setup slack margin.

EXAMPLE

The following is an example of the exemplary method outlined in FIG. 4 utilizing any tables and figures discussed herein. As shown in Table 2, segment "h" has the largest weight (weight equal to "9"). As a result, the exemplary method would start with segment "h."

After determining that the steps in 409a and 409b are not relevant (for this example), segment "h" is selected as the first segment for inserting a buffer. It is noted that inserting the buffer at segment "h" would correct 9 timing paths. Furthermore, as illustrated in Table 1, path numbers 1, 2, 3, 7, 8, 9, 13, 14 and 15 each contain segment "h." Thus, each of path numbers 1, 2, 3, 7, 8, 9, 13, 14 and 15 would be corrected by inserting the buffer at segment "h."

In the next iteration, the above mentioned paths, path numbers (1, 2, 3, 7, 8, 9, 13, 14 and 15) are removed from Table 1. This is shown in Table 3.

TABLE 3

| Timing paths | |
| --- | --- |
| Path no. | Paths |
| 4 | $s_1$-a-d-g-i-m-p-$e_1$ |
| 5 | $s_1$-a-d-g-j-n-q-$e_2$ |
| 6 | $s_1$-a-d-g-k-o-r-$e_3$ |
| 10 | $s_2$-b-d-g-i-m-p-$e_1$ |
| 11 | $s_2$-b-d-g-j-n-q-$e_2$ |
| 12 | $s_2$-b-d-g-k-o-r-$e_3$ |

Furthermore, the matrix shown in Table 2 is computed again for the remaining data points (paths shown in Table 3). The new matrix is shown in Table 4.

TABLE 4

| Segments and Weights | |
| --- | --- |
| Segment(s) | Weight(s) |
| g | 6 |
| d | 6 |
| a | 3 |
| b | 3 |
| r | 2 |
| o | 1 |
| m | 2 |
| i | 2 |
| q | 2 |

TABLE 4-continued

Segments and Weights

| Segment(s) | Weight(s) |
|---|---|
| j | 2 |
| k | 2 |
| p | 2 |

As shown in Table 4, segment "g" has the largest weight (weight equal to "6"). As a result, the exemplary method would start with segment "g."

After determining that the steps in 409a and 409b are not relevant (for this example), segment "g" is selected as the next segment for inserting a buffer. It is noted that inserting the buffer at segment "g" would correct 6 timing paths since path numbers 4, 5, 6, 10, 11 and 12 each contain segment "g." (As illustrated in Table 3). Thus, each of path numbers 4, 5, 6, 10, 11 and 12 would be corrected by inserting the buffer at segment "g." Therefore, by inserting the buffer at segment "g", the remaining hold violations are repaired.

As a result, by inserting only two buffers, 15 different paths with hold violations were corrected. Furthermore, the conventional method of adding a buffer at the endpoints of each timing path would have resulted in the addition of five buffers (one buffer at each of the 5 endpoints of the timing path), as compared to two buffers.

Figure 5:
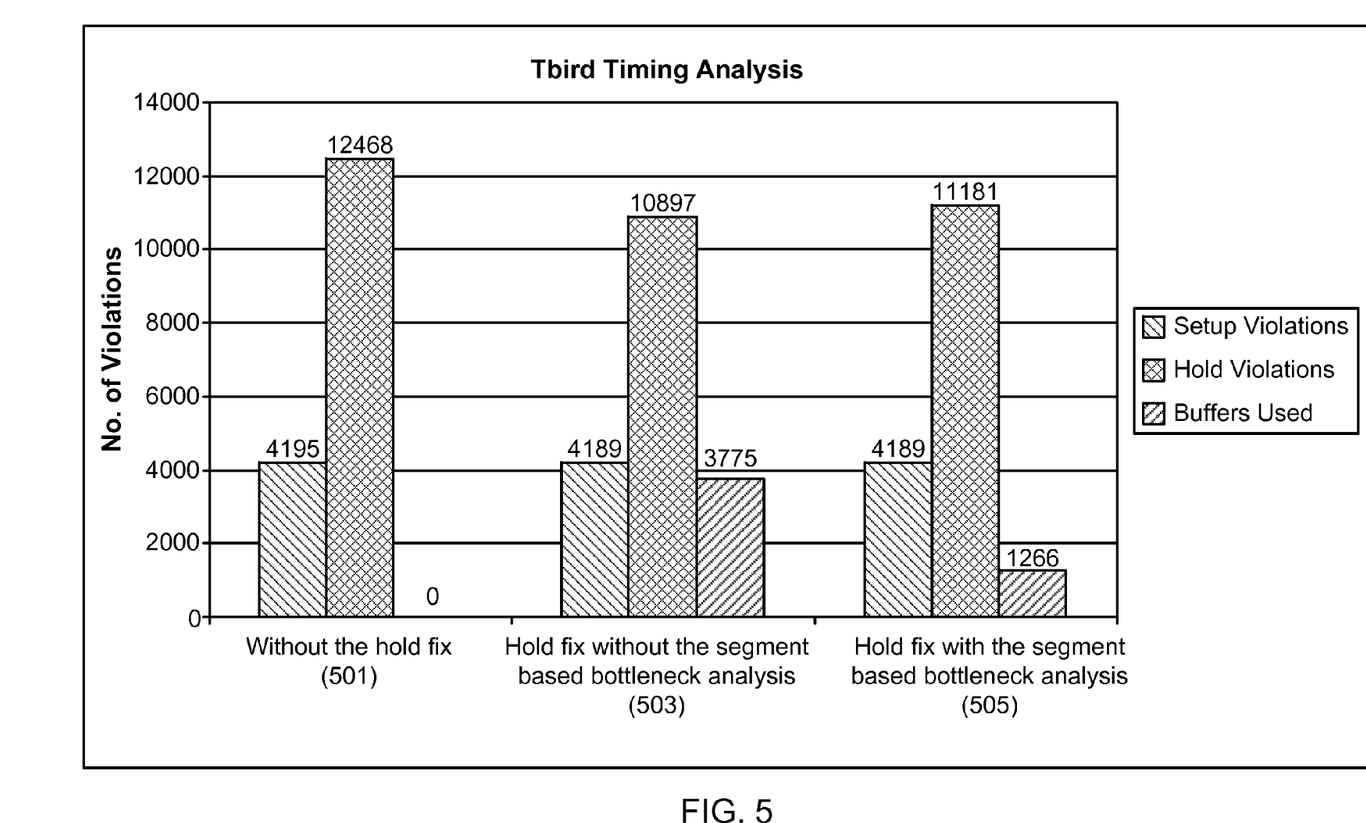
FIG. 5 illustrates a comparison chart by using the data from the Tbird (45 nm Chip) timing reports.

FIG. 5 illustrates a comparison chart by using the data from the Tbird (45 nm Chip) timing reports. In FIG. 5, the first set of bars (501) signify the number of setup and hold violations when there is no hold repairing performed. The second set of bars (503) signify the number of setup and hold violations when the conventional hold repairing approach is utilized (repairing the hold violations by placing buffers without taking into account the bottleneck analysis). The third set of bars (505) signify the number of setup and hold violations when the exemplary method described herein is utilized. From FIG. 5, it is clear that the exemplary segment and bipartite based bottleneck hold fixing technique described herein (505) repairs hold violations with approximately two third less buffers (when compared to the conventional approach to repairing hold violations).

Figure 6:
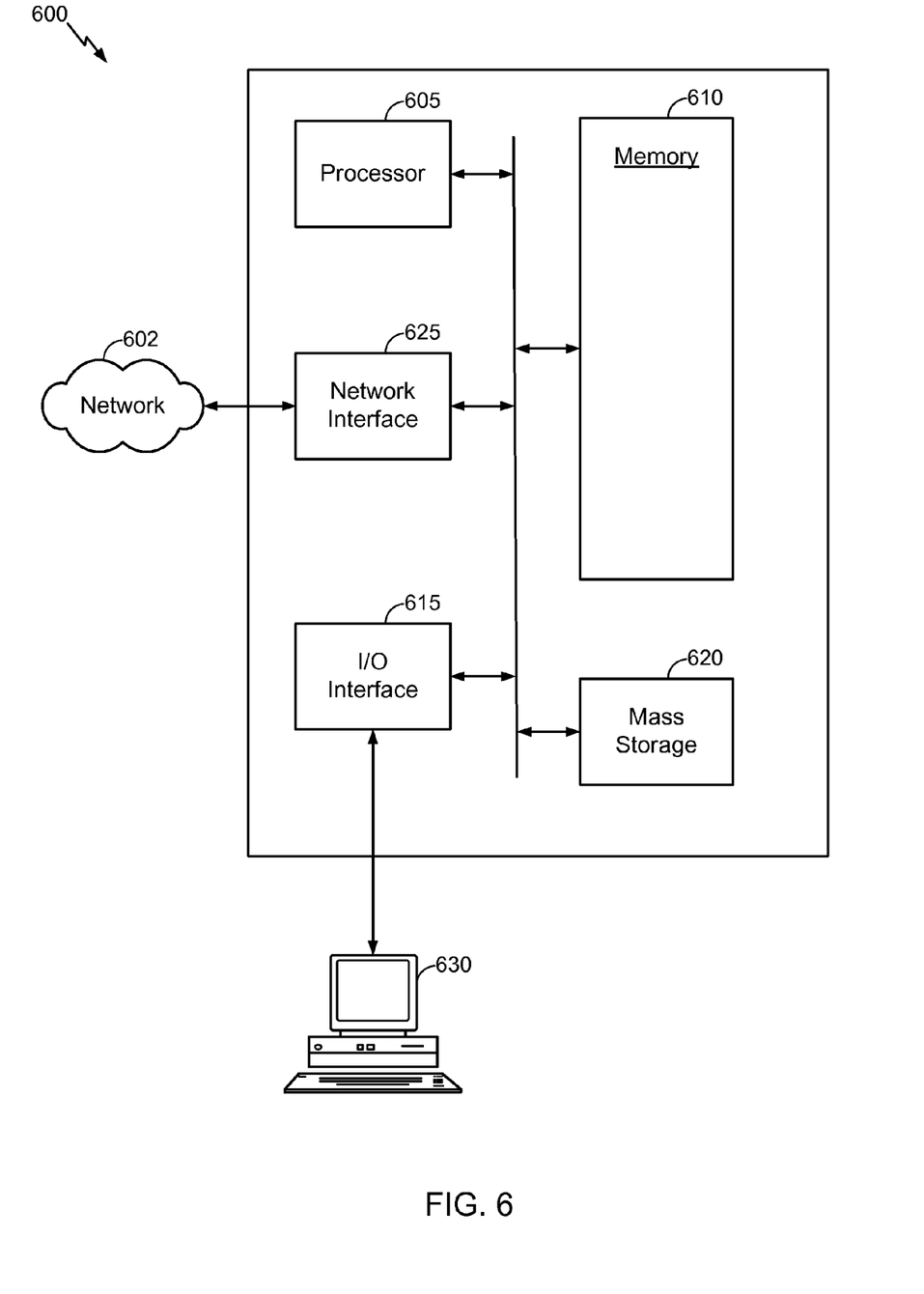
FIG. 6 illustrates a block diagram of an exemplary computer 600 consistent with another embodiment.

FIG. 6 illustrates a block diagram of an exemplary computer 600 consistent with another embodiment. The computer 600 may include a processor 605, a system bus 607, a mass storage unit 620, an I/O interface 615, a memory unit 610, and a network interface 625. The processor 605 may interface with memory 610 and the mass storage unit 620 via the system bus 607. The memory 610 and/or the mass storage unit 620 may contain executable instructions and data for implementing various operations for performing the network analysis and/or monitoring methods described herein. The network interface 625 may interface with the processor 605 over the system bus 607, and can provide an interface for communication with the network 602. The I/O interface 615 may be provided to permit a user to interface to the computer 605 via user interface 630. The computer 605 may be any type of computer utilizing any operating system. For example, the processor 605 may be an x86 based CPU, and utilize any operating system which may include varieties of the Windows, Unix and/or Linux operating systems. The computer 600 may also use high-level analysis software packages and/or custom software written in any programming and/or scripting languages. Alternatively, the computer 605 may be implemented as special purpose hardware.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM, a solid state memory device, such as a flash-drive, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Accordingly, an embodiment can include a computer readable media embodying a method for reducing the number of hold violations in an integrated circuit. Accordingly, the invention is not limited to illustrated examples and any means for performing the functionality described herein are included.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements of the embodiments may be described or claimed in the singular, the plural is contemplated unless limitation to the singular is explicitly stated.

What is claimed is:

1. A method of reducing the number of hold violations in an integrated circuit, the method comprising:
   determining at least one segment of the circuit, wherein each segment is a connection between a plurality of circuit nodes;
   associating at least one timing path with each segment, wherein each timing path is a connection of circuit nodes, including a starting point node and an endpoint node, that covers one or more segments;
   determining a weight for each segment, wherein the weight is determined by a number of timing paths associated with the segment;
   ranking each segment based upon the determined weight associated with the segment; and
   employing at least one processor in inserting a delay buffer at least one of the segments based upon said ranking.

2. The method of claim 1, wherein the weight of each segment corresponds to the total number of timing paths associated with the segment.

3. The method of claim 1, wherein the buffer is inserted at the segment with the largest weight.

4. The method of claim 1, wherein the ranking is performed in ascending order.

5. The method of claim 1, wherein the ranking is performed in descending order.

6. The method of claim 1, further comprising:
   determining a number of timing paths to be removed, wherein the timing paths to be removed are the timing paths that pass through the segment with the largest weight;
   removing the determined number of timing paths from the first ranking and the associated segments;
   determining a second weight for each remaining segment, wherein the second weight is the total number of timing paths associated with the segment; and
   ranking the remaining segments based upon the second weight associated with each segment; and
   inserting a second buffer at the segment with the largest weight.

7. The method of claim 6, wherein the ranking of the remaining segments is performed in ascending order.

8. The method of claim 6, wherein the ranking of the remaining segments is performed in descending order.

9. An apparatus for reducing the number of hold violations in an integrated circuit, the apparatus comprising:
   a processor configured to:
   determine at least one segment of the circuit, wherein each segment is a connection between a plurality of circuit nodes;
   associate at least one timing path with each segment, wherein each timing path is a connection of circuit nodes, including a starting point node and an endpoint node, that covers one or more segments;
   determine a weight for each segment, wherein the weight is determined by a number of timing paths associated with the segment;
   rank each segment based upon the determined weight associated with the segment; and
   a memory coupled to the processor for storing data.

10. The apparatus of claim 9, wherein the weight of each segment corresponds to the total number of timing paths associated with the segment.

11. The apparatus of claim 9, wherein the buffer is inserted at the segment with the largest weight.

12. The apparatus of claim 9, wherein the ranking is performed in ascending order.

13. The apparatus of claim 9, wherein the ranking is performed in descending order.

14. The apparatus of claim 9, wherein the processor is further configured to:
   determine a number of timing paths to be removed, wherein the timing paths to be removed are the timing paths that pass through the segment with the largest weight;
   remove the determined number of timing paths from the first ranking and the associated segments;
   determine a second weight for each remaining segment, wherein the second weight is the total number of timing paths associated with the segment; and
   rank the remaining segments based upon the second weight associated with each segment; and
   insert a second buffer at the segment with the largest weight.

15. The apparatus of claim 14, wherein the ranking of the remaining segments is performed in ascending order.

16. The apparatus of claim 14, wherein the ranking of the remaining segments is performed in descending order.

17. An apparatus for reducing the number of hold violations in an integrated circuit, the apparatus comprising:
   means for determining at least one segment of the circuit, wherein each segment is a connection between a plurality of circuit nodes;
   means for associating at least one timing path with each segment, wherein each timing path is a connection of circuit nodes, including a starting point node and an endpoint node, that covers one or more segments;
   means for determining a weight for each segment, wherein the weight is determined by a number of timing paths associated with the segment;
   means for ranking each segment based upon the determined weight associated with the segment; and
   means for inserting a delay buffer at least one of the segments based upon said ranking.

18. The apparatus of claim 17, wherein the weight of each segment corresponds to the total number of timing paths associated with the segment.

19. The apparatus of claim 17, wherein the buffer is inserted at the segment with the largest weight.

20. The apparatus of claim 17, wherein the ranking is performed in ascending order.

21. The apparatus of claim 17, wherein the ranking is performed in descending order.

22. The apparatus of claim 17, further comprising:
   means for determining a number of timing paths to be removed, wherein the timing paths to be removed are the timing paths that pass through the segment with the largest weight;
   means for removing the determined number of timing paths from the first ranking and the associated segments;
   means for determining a second weight for each remaining segment, wherein the second weight is the total number of timing paths associated with the segment; and
   means for ranking the remaining segments based upon the second weight associated with each segment; and
   means for inserting a second buffer at the segment with the largest weight.

23. The apparatus of claim 22, wherein the ranking of the remaining segments is performed in ascending order.

24. The apparatus of claim 22, wherein the ranking of the remaining segments is performed in descending order.

25. A non-transitory computer-readable storage medium comprising code, which, when executed by a processor, causes the processor to perform operations for reducing the number of hold violations in an integrated circuit, the computer-readable storage medium comprising:
- code for determining at least one segment of the circuit, wherein each segment is a connection between a plurality of circuit nodes;
- code for associating at least one timing path with each segment, wherein each timing path is a connection of circuit nodes, including a starting point node and an endpoint node, that covers one or more segments;
- code for determining a weight for each segment, wherein the weight is determined by a number of timing paths associated with the segment;
- code for ranking each segment based upon the determined weight associated with the segment; and
- code for inserting a delay buffer at least one of the segments based upon said ranking.

26. The non-transitory computer-readable storage medium of claim 25, wherein the weight of each segment corresponds to the total number of timing paths associated with the segment.

27. The non-transitory computer-readable storage medium of claim 25, wherein the buffer is inserted at the segment with the largest weight.

28. The non-transitory computer-readable storage medium of claim 25, wherein the ranking is performed in ascending order.

29. The non-transitory computer-readable storage medium of claim 25, wherein the ranking is performed in descending order.

30. The non-transitory computer-readable storage medium of claim 25, further comprising:
- code for determining a number of timing paths to be removed, wherein the timing paths to be removed are the timing paths that pass through the segment with the largest weight;
- code for removing the determined number of timing paths from the first ranking and the associated segments;
- code for determining a second weight for each remaining segment, wherein the second weight is the total number of timing paths associated with the segment; and
- code for ranking the remaining segments based upon the second weight associated with each segment; and
- code for inserting a second buffer at the segment with the largest weight.

31. The non-transitory computer-readable storage medium of claim 30, wherein the ranking of the remaining segments is performed in ascending order.

32. The non-transitory computer-readable storage medium of claim 30, wherein the ranking of the remaining segments is performed in descending order.

33. A method of reducing the number of hold violations in an integrated circuit, the method comprising:
- step for determining at least one segment of the circuit, wherein each segment is a connection between a plurality of circuit nodes;
- step for associating at least one timing path with each segment, wherein each timing path is a connection of circuit nodes, including a starting point node and an endpoint node, that covers one or more segments;
- step for determining a weight for each segment, wherein the weight is determined by a number of timing paths associated with the segment;
- step for ranking each segment based upon the determined weight associated with the segment; and
- step for employing at least one processor in inserting a delay buffer at least one of the segments based upon said ranking.

34. The method of claim 33, wherein the weight of each segment corresponds to the total number of timing paths associated with the segment.

35. The method of claim 33, wherein the buffer is inserted at the segment with the largest weight.

36. The method of claim 33, wherein the ranking is performed in ascending order.

37. The method of claim 33, wherein the ranking is performed in descending order.

38. The method of claim 33, further comprising:
- step for determining a number of timing paths to be removed, wherein the timing paths to be removed are the timing paths that pass through the segment with the largest weight;
- step for removing the determined number of timing paths from the first ranking and the associated segments;
- step for determining a second weight for each remaining segment, wherein the second weight is the total number of timing paths associated with the segment; and
- step for ranking the remaining segments based upon the second weight associated with each segment; and
- step for inserting a second buffer at the segment with the largest weight.

39. The method of claim 38, wherein the ranking of the remaining segments is performed in ascending order.

40. The method of claim 38, wherein the ranking of the remaining segments is performed in descending order.

* * * * *